US012044059B2

(12) United States Patent
Erickson

(10) Patent No.: US 12,044,059 B2
(45) Date of Patent: Jul. 23, 2024

(54) ARTICLE EXCHANGE ASSEMBLY

(71) Applicant: Colette Erickson, Circle Pines, MN (US)

(72) Inventor: Colette Erickson, Circle Pines, MN (US)

( * ) Notice: Subject to any disclaimer, the term of this patent is extended or adjusted under 35 U.S.C. 154(b) by 366 days.

(21) Appl. No.: 17/494,462

(22) Filed: Oct. 5, 2021

(65) Prior Publication Data

US 2023/0106529 A1 Apr. 6, 2023

(51) Int. Cl.
*E05G 7/00* (2006.01)
*E05G 5/00* (2006.01)

(52) U.S. Cl.
CPC ............. *E05G 7/008* (2013.01); *E05G 5/006* (2013.01); *E05G 7/005* (2013.01)

(58) Field of Classification Search
CPC ......... E05G 1/005; E05G 5/006; E05G 7/005; E05G 7/008
See application file for complete search history.

(56) References Cited

U.S. PATENT DOCUMENTS

| | | | | |
|---|---|---|---|---|
| 2,914,244 A * | 11/1959 | Wheeler | E05G 7/008 | 312/28 |
| 3,145,918 A * | 8/1964 | Higgins | E05G 7/008 | 109/19 |
| 3,237,853 A * | 3/1966 | Grosswiller, Jr. | E05G 7/008 | 109/66 |
| 4,135,658 A * | 1/1979 | Hagberg | E05G 7/008 | 232/44 |
| 4,393,789 A * | 7/1983 | Glotfelter | E05G 7/008 | 109/19 |
| 4,640,200 A * | 2/1987 | Richardson | E05G 7/008 | 109/19 |
| 5,615,624 A * | 4/1997 | Terry | E05G 7/008 | 109/66 |
| 5,802,991 A * | 9/1998 | Brown | E05G 7/008 | 109/66 |
| 7,575,125 B2 | 8/2009 | Bagley, Jr. | | |
| 7,721,660 B1 * | 5/2010 | Davis | E05G 7/008 | 109/66 |
| 9,021,840 B2 * | 5/2015 | Andrews | E05G 1/00 | 109/59 R |
| 10,235,824 B1 | 3/2019 | Ross | | |
| 2009/0140023 A1 | 6/2009 | Noble | | |
| 2016/0176041 A1 | 6/2016 | Green | | |
| 2022/0236717 A1 * | 7/2022 | Augustin | E05G 7/008 | |

FOREIGN PATENT DOCUMENTS

WO WO2004014198 2/2004

* cited by examiner

*Primary Examiner* — Christopher J Boswell

(57) ABSTRACT

An article exchange assembly for reducing transmission of pathogens includes a housing, which is mountable in an opening in a wall of a structure below a service window positioned in the wall. The housing extends from the opening into the structure and has a front face, which is open. A set of drawer slides is engaged to and positioned in the housing. The drawer slides are selectively extensible through the front face of the housing. A drawer is operationally engaged to the set of drawer slides. A plurality of fasteners is engaged to a tray, which is positioned in the drawer. The fasteners selectively engage article to the tray. A lift module selectively elevates the tray to positioned proximate to a top of the drawer so that the articles are accessible to a person seated in a vehicle positioned exterior to the structure and proximate to the service window.

10 Claims, 10 Drawing Sheets

ARTICLE EXCHANGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to exchange assemblies and more particularly pertains to a new exchange assembly for reducing transmission of pathogens. The present invention discloses an exchange assembly for use in a drive-thru comprising a drawer in which a height adjustable tray is positioned. The drawer can be extended from a structure toward a vehicle, whereupon the tray can be elevated to render items on the tray readily accessible to a person in the vehicle. The exchange assembly enables contactless payments and transfers of food and beverages to reduce transmission of pathogens.

(2) Description of Related Art Including Information Disclosed Under 37 CFR 1.97 and 1.98

The prior art relates to exchange assemblies, which may comprise boxes on stick handles, elongated spoon like devices, extendable transaction trays as used in banks, and the like. What is lacking in the prior art is an exchange assembly for use in a drive-thru comprising a drawer in which a height adjustable tray is positioned. The drawer can be extended from a structure toward a vehicle, whereupon the tray can be elevated to render items on the tray readily accessible to a person in the vehicle. The exchange assembly enables contactless payments and transfers of food and beverages to reduce transmission of pathogens.

BRIEF SUMMARY OF THE INVENTION

An embodiment of the disclosure meets the needs presented above by generally comprising a housing, which is configured to be mountable in an opening in a wall of a structure below a service window positioned in the wall. The housing extends from the opening into the structure and has a front face, which is open. A set of drawer slides is engaged to and positioned in the housing. The drawer slides are selectively extensible through the front face of the housing. A drawer is operationally engaged to the set of drawer slides and thus is configured to be selectively extended through the opening.

A plurality of fasteners is engaged to a tray, which is positioned in the drawer. Each fastener is configured to selectively engage a respective article so that the respective article is removably engaged to the tray. A lift module is operationally engaged to the tray and is positioned to selectively elevate the tray from a stowed configuration to a deployed configuration. In the stowed configuration, the tray is positioned proximate to a bottom of the drawer. In the deployed configuration, the tray is positioned proximate to a top of the drawer and the respective article is accessible to a person seated in a vehicle positioned exterior to the structure and proximate to the service window.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
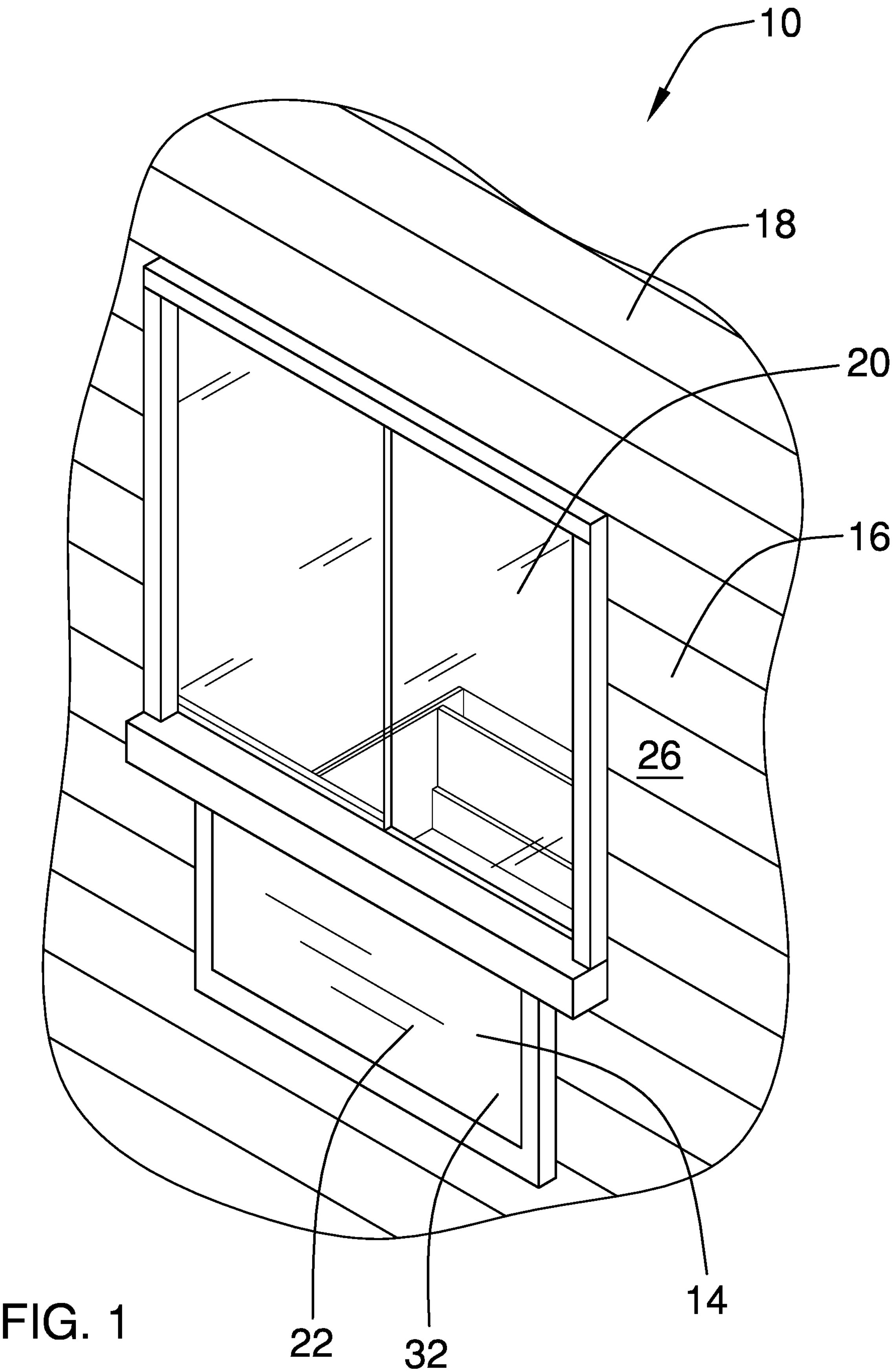
FIG. 1 is a front isometric perspective view of an article exchange assembly according to an embodiment of the disclosure in a retracted configuration.

With reference now to the drawings, and in particular to FIGS. 1 through 10 thereof, a new exchange assembly embodying the principles and concepts of an embodiment of the disclosure and generally designated by the reference numeral 10 will be described.

Figure 2:
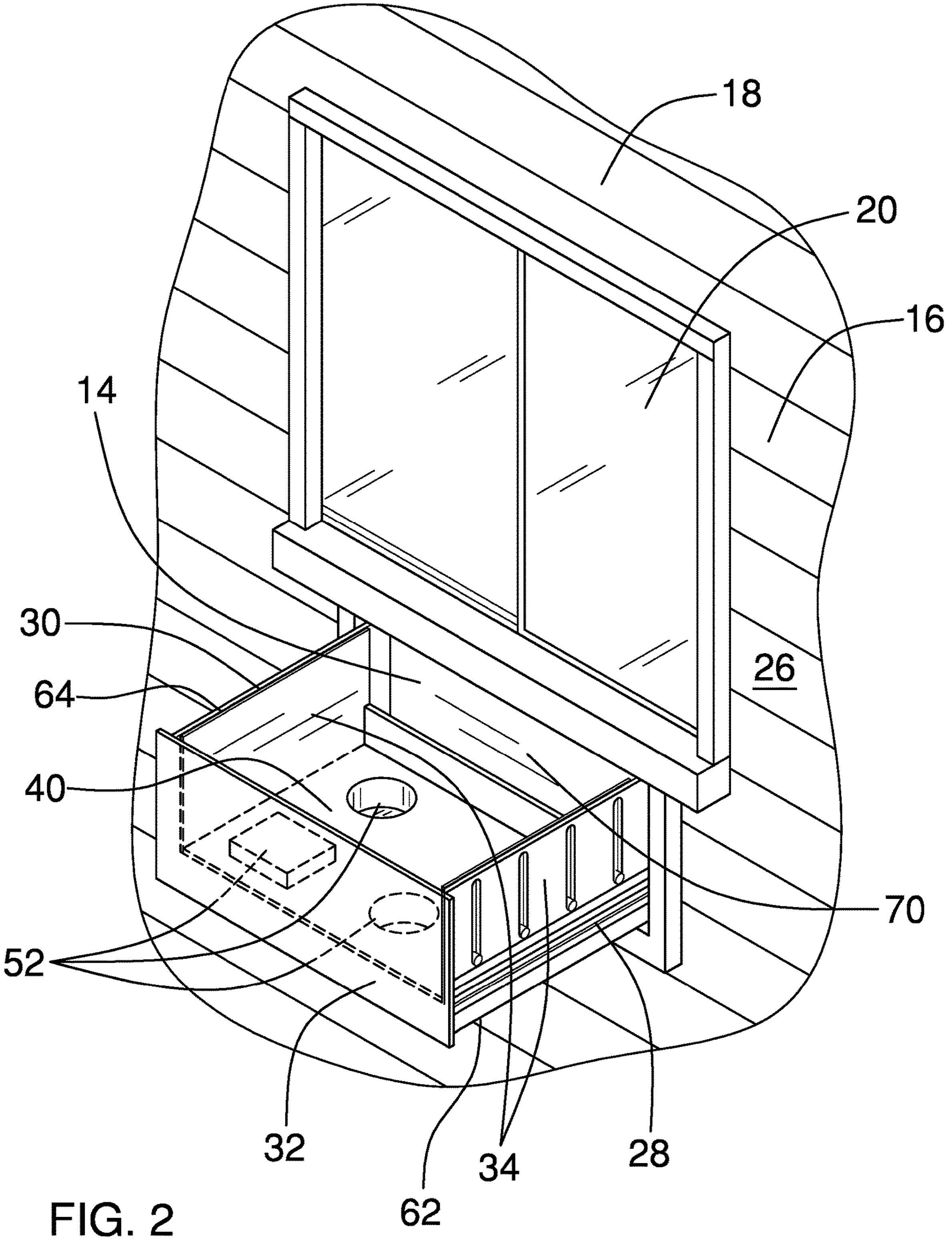
FIG. 2 is an isometric perspective view of an embodiment of the disclosure in an extended configuration.
Figure 3:
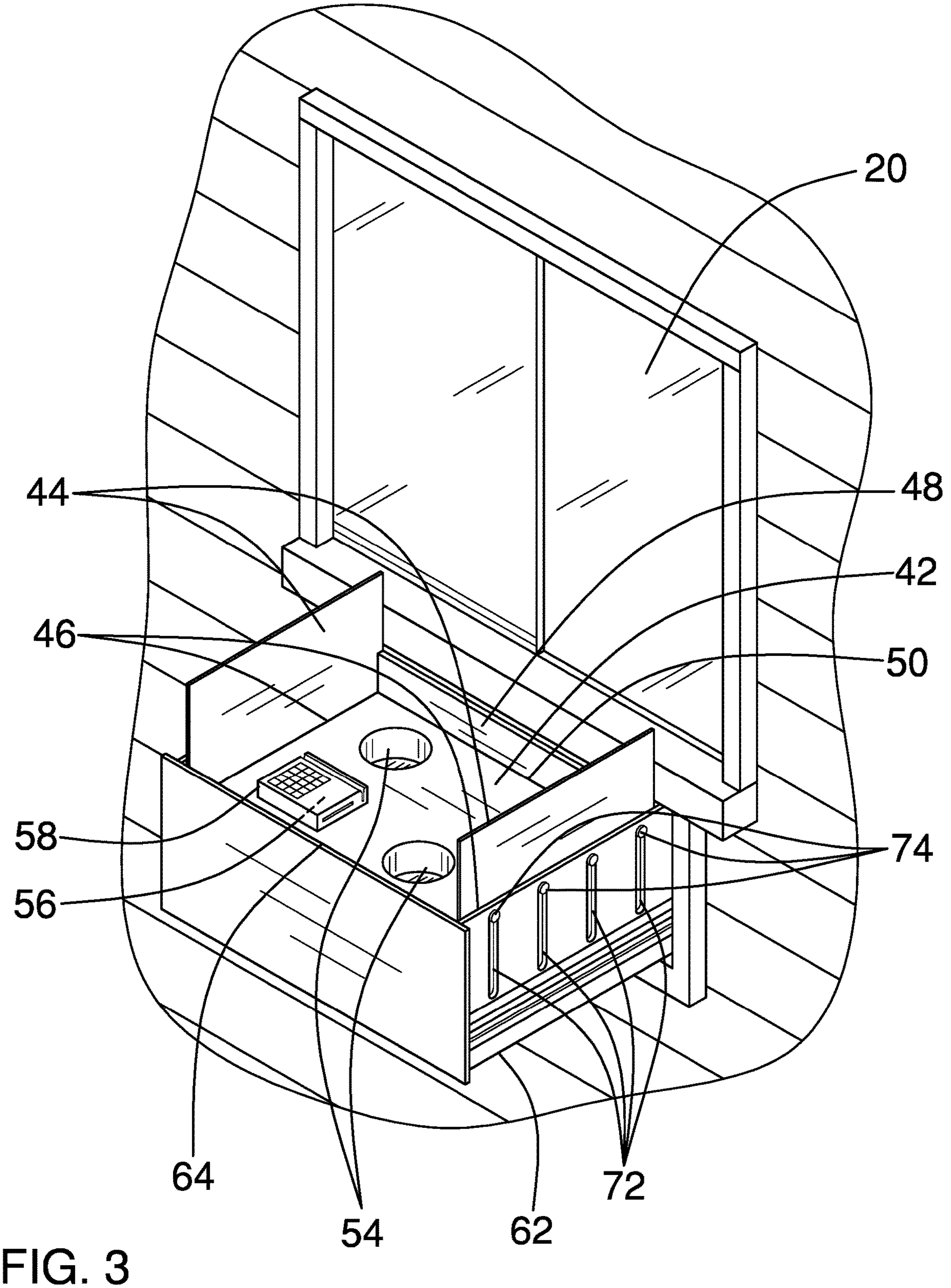
FIG. 3 is an isometric perspective view of an embodiment of the disclosure in an extended and deployed configuration.
Figure 4:
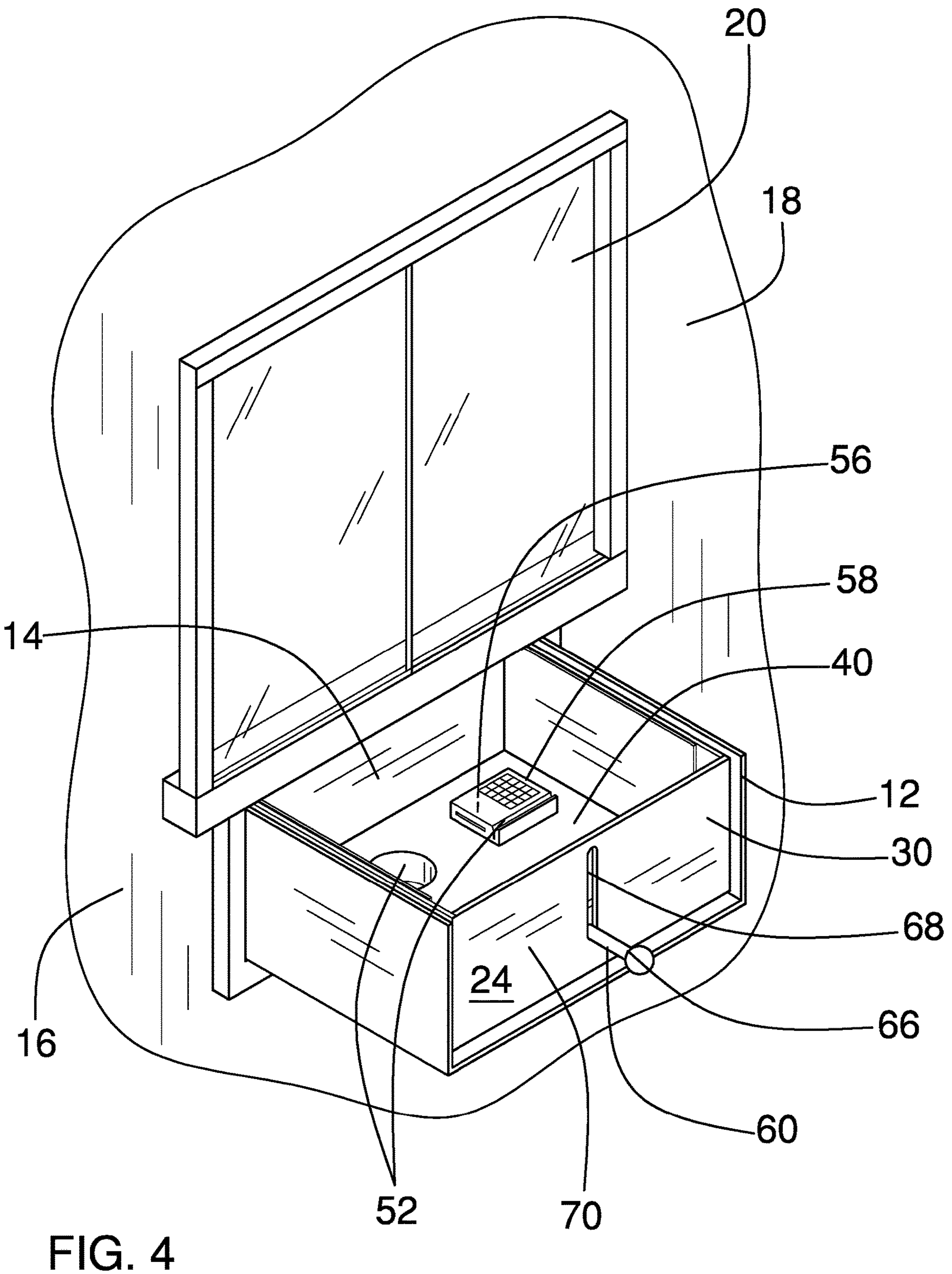
FIG. 4 is a rear isometric perspective view of an embodiment of the disclosure in a retracted configuration.
Figure 5:
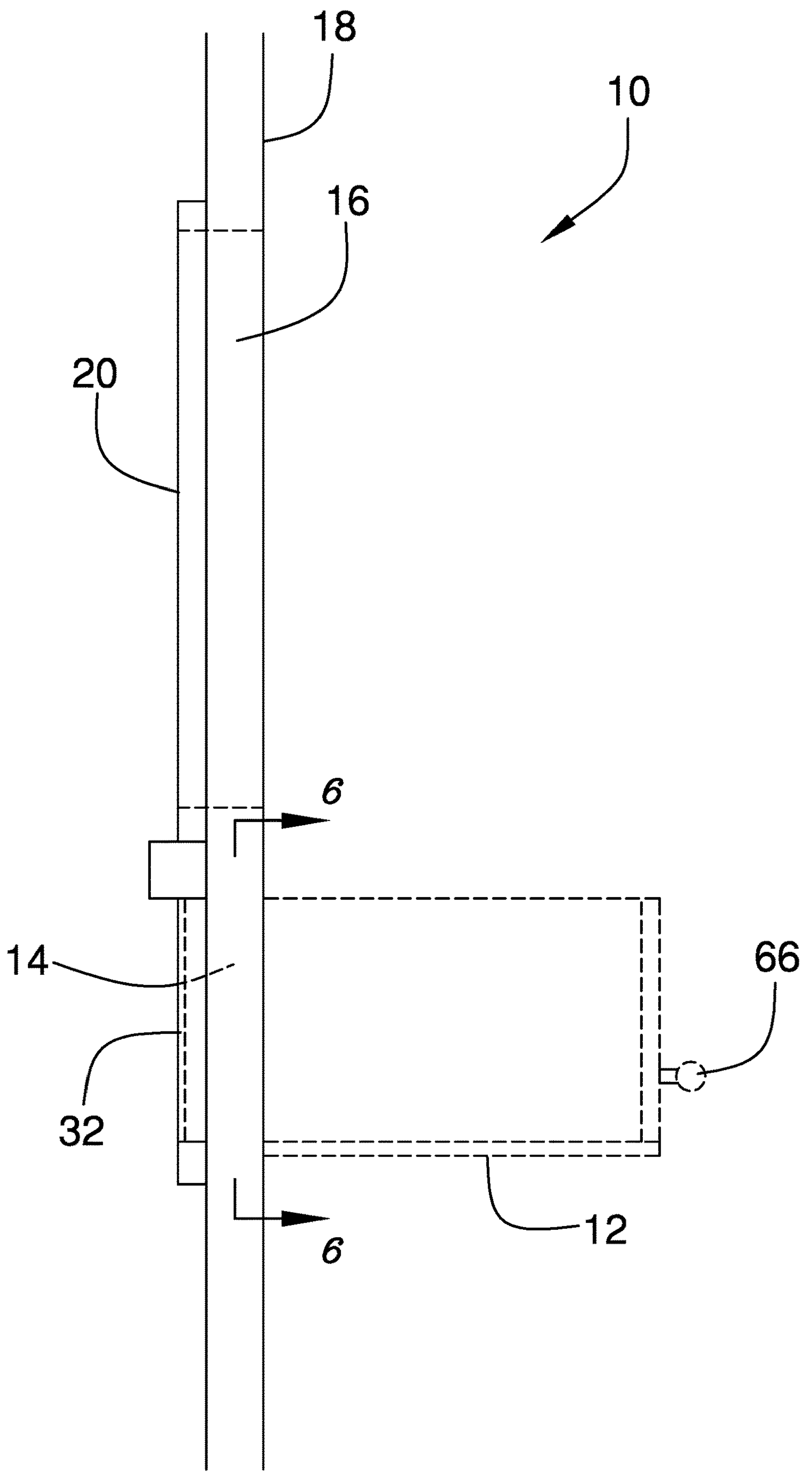
FIG. 5 is a side view of an embodiment of the disclosure.

As best illustrated in FIGS. 1 through 10, the article exchange assembly 10 generally comprises a housing 12, which is configured to be mountable in an opening 14 in a wall 16 of a structure 18 below a service window 20 positioned in the wall 16, as shown in FIG. 4. The housing 12 extends from the opening 14 into the structure 18. The housing 12 has a front face 22 and a rear face 24, which are open. The front face 22 is positioned substantially flush to an exterior surface 26 of the wall 16, as shown in FIG. 1.

A set of drawer slides 28 is engaged to and positioned in the housing 12. The drawer slides 28 are selectively extensible through the front face 22 of the housing 12. A drawer 30 is operationally engaged to the set of drawer slides 28 and thus is configured to be selectively extended through the opening 14. A front 32 of the drawer 30 is circumferentially larger than the opening 14 so that the opening 14 is substantially closed with the drawer 30 is positioned in the housing 12, as shown in FIG. 1.

Figure 6:
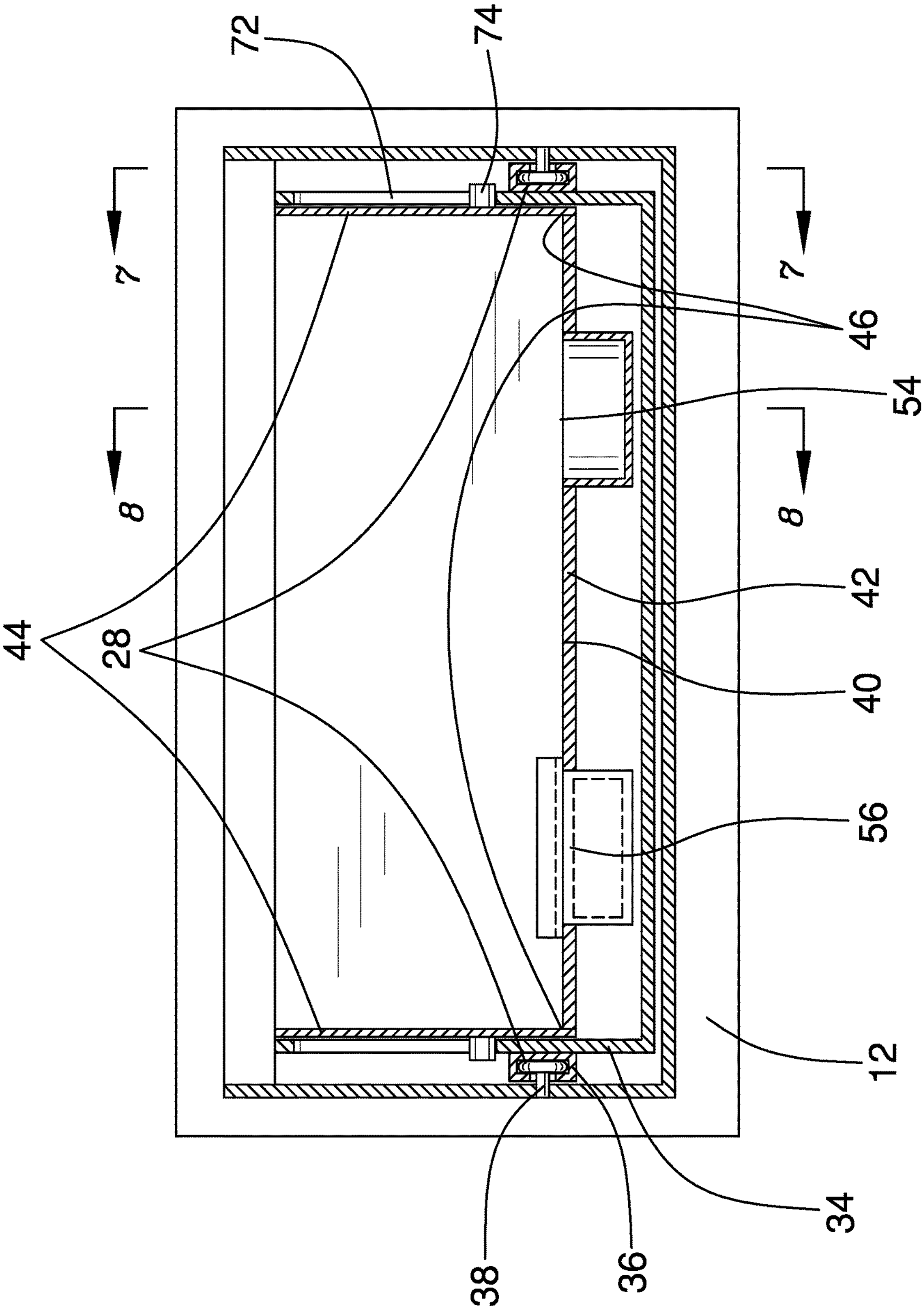
FIG. 6 is a cross-sectional view of an embodiment of the disclosure.

The set of drawer slides 28 comprises may two drawer slides 28 positioned singly on opposing sides 34 of the drawer 30, as shown in FIG. 6. Each drawer slide 28 comprises a track 36, which is engaged to the drawer 30, and a plurality of rollers 38, which is engaged to the housing 12. Each roller 38 is operationally engaged to a respective track 36 so that the respective track 36 is rollably extensible along associated rollers 38 through the front face 22 of the housing 12 and the opening 14.

A tray 40 is positioned in the drawer 30. The tray 40 comprises a bottom panel 42, a pair of opposed side panels 44, which extends from opposed edges 46 of the bottom panel 42, and a rear panel 48, which extends from a rear edge 50 of the bottom panel 42 and between the opposed side panels 44.

A plurality of fasteners 52 is engaged to the tray 40. Each fastener 52 is configured to selectively engage a respective article so that the respective article is removably engaged to the tray 40. The plurality of fasteners 52 comprises a set of holes 54 and a connector 56, as shown in FIG. 3. The holes 54 are positioned in the bottom panel 42, with each hole 54 being sized complementarily to a beverage container, such as a coffee cup. The hole 54 is configured for insertion of the beverage container to removably engage the beverage container to the tray 40. The hole 54 may comprise a recess 76 in the tray 40. The connector 56, which may comprise screws, adhesives, hook and loop fasteners, and the like, is engaged to the bottom panel 42 and is configured to engage a point of sale device 58. The connector 56 is configured to engage the point of sale device 58 to the tray 40.

A lift module 60 is operationally engaged to the tray 40 and is positioned to selectively elevate the tray 40 from a stowed configuration, as shown in FIG. 2, to a deployed configuration, as shown in FIG. 3. In the stowed configuration, the tray 40 is positioned proximate to a bottom 62 of the drawer 30. In the deployed configuration, the tray 40 is positioned proximate to a top 64 of the drawer 30 and the respective article is accessible to a person seated in a vehicle positioned exterior to the structure 18 and proximate to the service window 20.

The lift module 60 may comprise a handle 66, which is engaged to the rear panel 48 and which extends through an aperture 68 positioned in a rear 70 of the drawer 30. The aperture 68 extends from proximate to the bottom 62 to proximate to the top 64 of the drawer 30. The handle 66 is configured to be grasped in a hand of a user positioned in the structure 18 proximate to the service window 20, positioning the user to push the drawer 30 along the drawer slides 28 through the opening 14 and to lift the tray 40 so that the respective article is accessible to the person seated in the vehicle.

Figure 7:
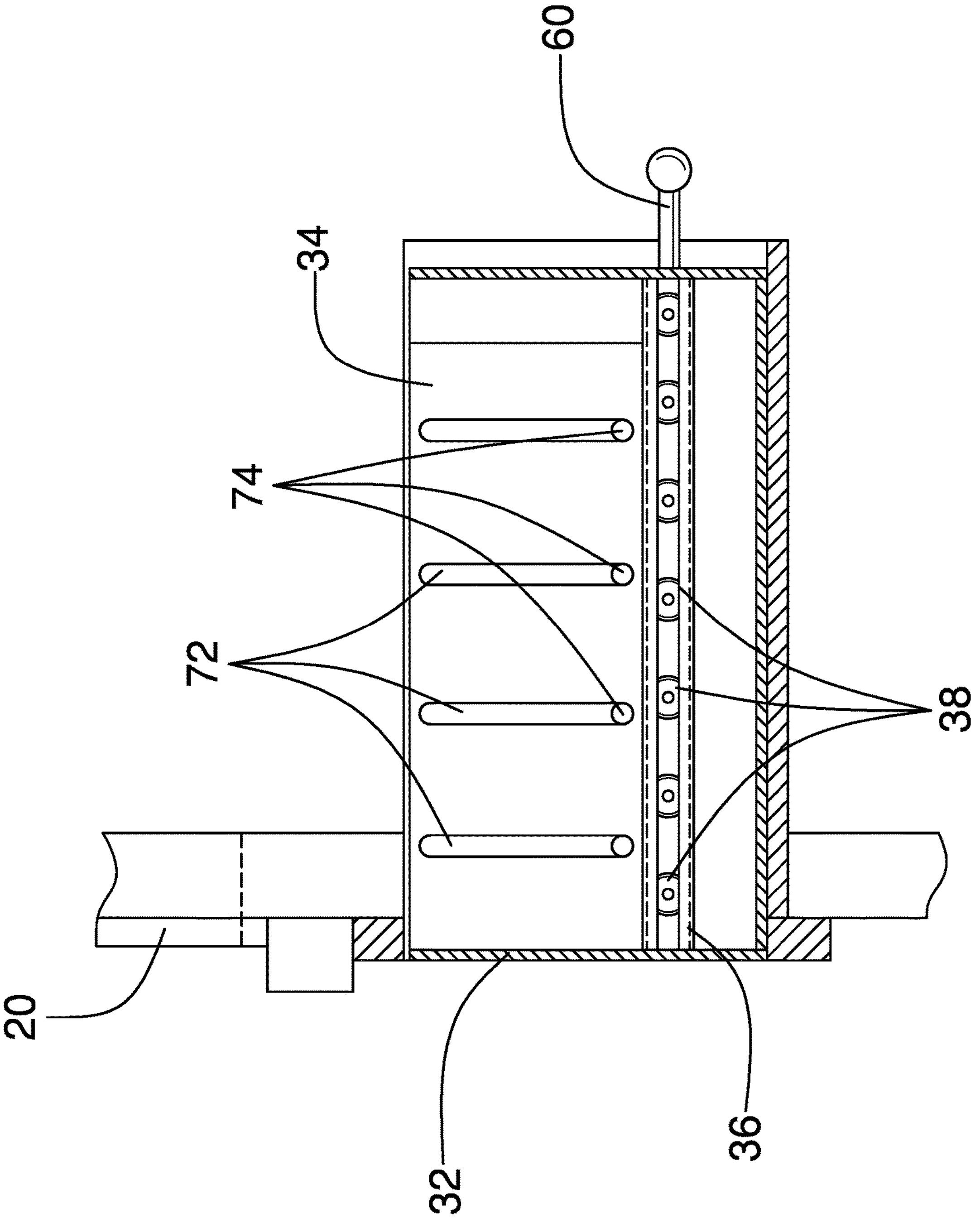
FIG. 7 is a cross-sectional view of an embodiment of the disclosure.
Figure 8:
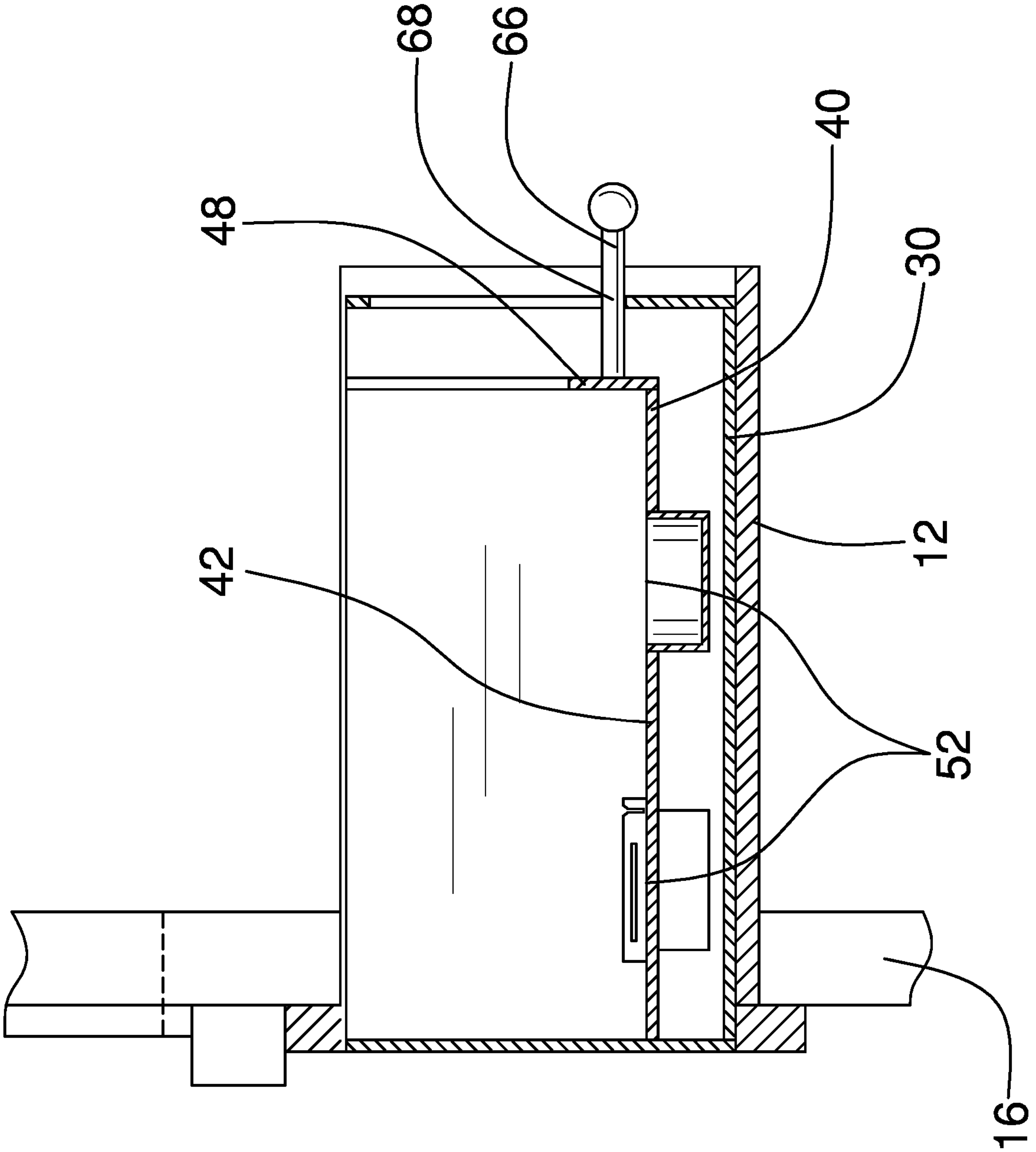
FIG. 8 is a cross-sectional view of an embodiment of the disclosure.
Figure 9:
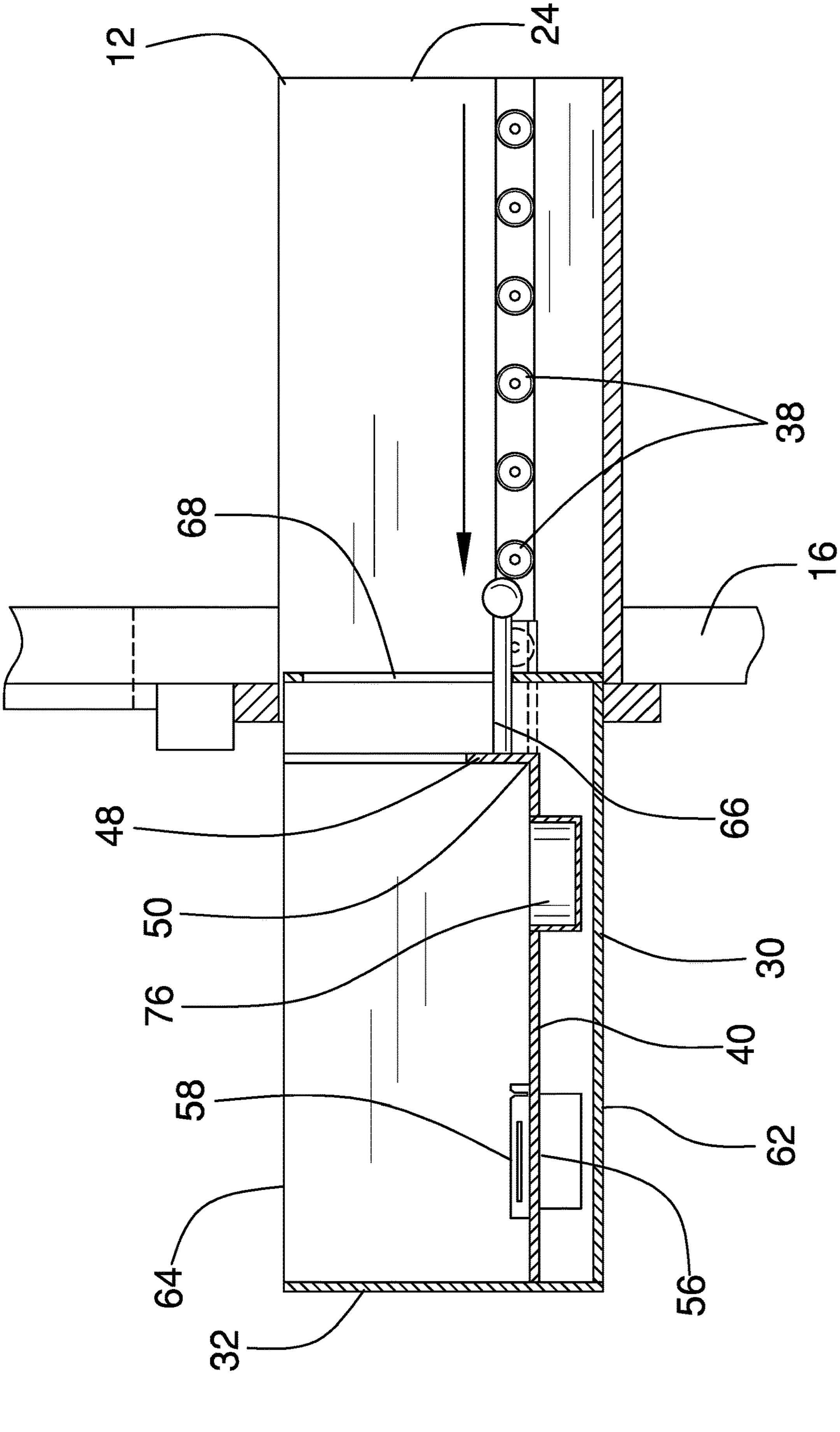
FIG. 9 is a cross-sectional view of an embodiment of the disclosure.
Figure 10:
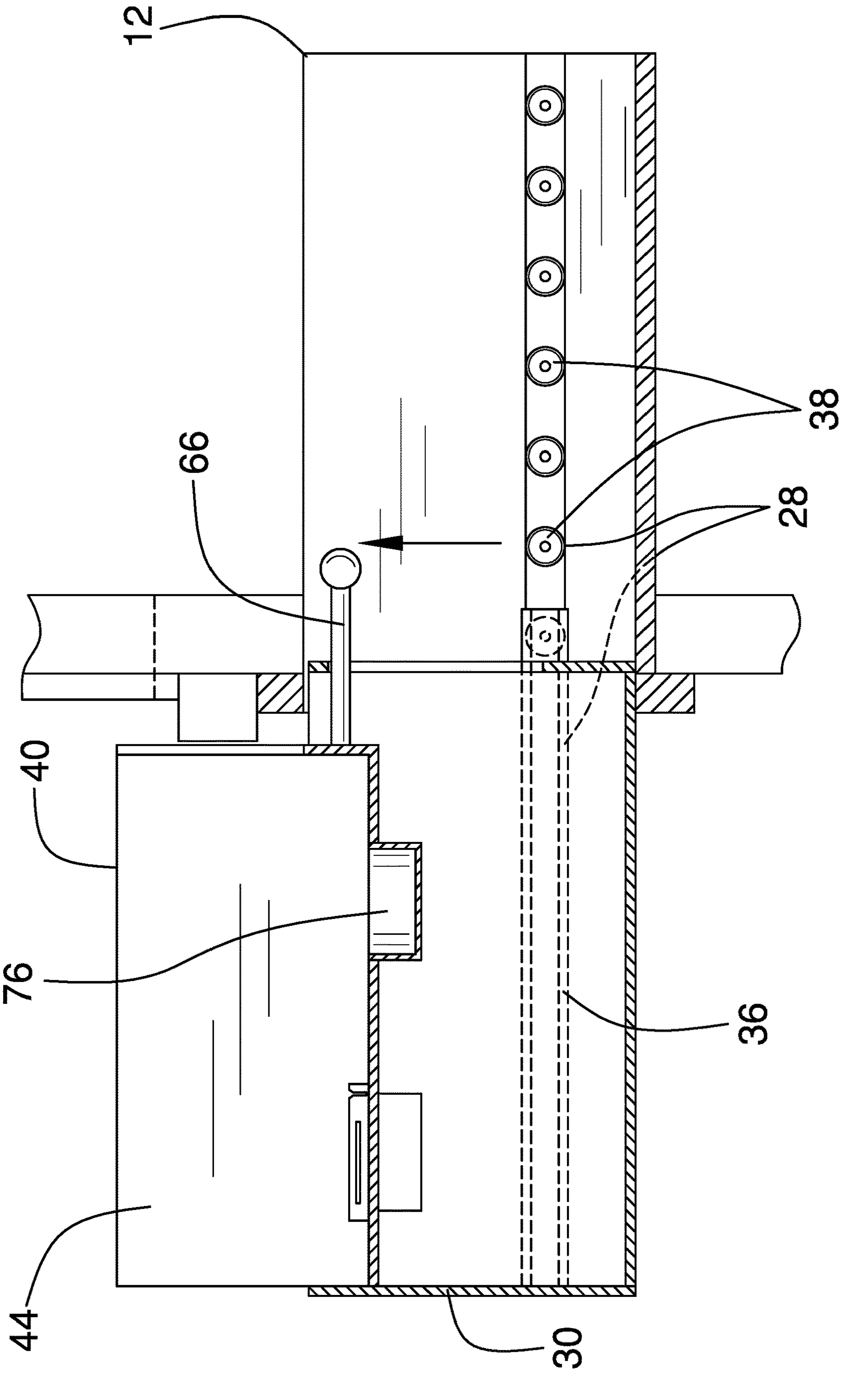
FIG. 10 is a cross-sectional view of an embodiment of the disclosure.

A plurality of slots 72 is positioned in the opposing sides 34 of the drawer 30, as shown in FIG. 7. Each slot 72 extends from proximate to the bottom 62 to proximate to the top 64 of the drawer 30. Each of a plurality of pins 74 is engaged to the tray 40 and extends through a respective slot 72 so that the pins 74 guide the tray 40 between the stowed configuration and the deployed configuration.

In use, the housing 12 is mounted in the opening 14 positioned in the wall 16 below the service window 20. The point of sale device 58 is mounted to the tray 40 using the connector 56. The user then can position beverage containers in the holes 54, grasp the handle 66, and push the tray 40 through the opening 14. The user then pulls up on the handle 66 to elevate the tray 40 from the stowed configuration to the deployed configuration. The point of sale device 58 and the beverage containers then are accessible to the person seated in the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. An article exchange assembly comprising:

a housing configured to be mountable in an opening in a wall of a structure below a service window positioned in the wall, such that the housing extends from the opening into the structure, the housing having a front face, the front face being open;

a set of drawer slides engaged to and positioned in the housing, such that the drawer slides are selectively extensible through the front face of the housing;

a drawer operationally engaged to the set of drawer slides, wherein the drawer is configured for selectively extending through the opening;

a tray positioned in the drawer;

a plurality of fasteners engaged to the tray, each fastener being configured for selectively engaging a respective article, such that the respective article is removably engaged to the tray; and a lift module operationally engaged to the tray such the tray is elevated relative to the drawer, the lift module being positioned for selectively elevating the tray from a stowed configuration, wherein the tray is positioned proximate to a bottom of the drawer, to a deployed configuration, wherein the tray is positioned proximate to a top of the drawer and wherein the respective article is accessible to a person seated in a vehicle positioned exterior to the structure and proximate to the service window.

2. The article exchange, assembly of claim 1, wherein:

the front face of the housing is positioned substantially flush to an exterior surface of the wall; and a front of the drawer is circumferentially larger than the opening, such that the opening is substantially closed with the drawer is positioned in the housing.

3. The article exchange assembly of claim 1, wherein the set of drawer slides comprises two drawer slides positioned singly on opposing sides of the drawer.

4. The article exchange, assembly of claim 1, wherein each drawer slide comprises:

a track engaged to the drawer; and a plurality of rollers engaged to the housing, each roller being operationally engaged to a respective track, such that the respective track is rollably extensible along associated rollers through the front face of the housing and the opening.

5. The article exchange assembly of claim 1, wherein:

the tray comprises:

a bottom panel, a pair of opposed side panels extending from opposed edges of the bottom panel, and a rear panel extending from a rear edge of the bottom panel and between the opposed side panels; and the plurality of fasteners comprises:

a set of holes positioned in the bottom panel, each hole being sized complementarily to a beverage container, wherein the hole is configured for insertion of the beverage container for removably engaging the beverage container to the tray, and a connector engaged to the bottom panel and being configured for engaging a point of sale device, wherein the connector is configured for engaging the point of sale device to the tray.

6. The article exchange assembly of claim 5, wherein;

the housing has a rear face, the rear face being open;

the lift module comprises a handle engaged to the rear panel and extending through an aperture positioned in a rear of the drawer, the aperture extending from proximate to the bottom to proximate to the top of the drawer; and wherein the handle is configured for grasping in a hand of a user positioned in the structure proximate to the service window, positioning the user for pushing the drawer along the drawer slides through the opening and for lifting the tray, such that the respective article is accessible to the person seated in the vehicle.

7. The article exchange assembly of claim 5, wherein the hole comprises a recess in the tray.

8. The article exchange assembly of claim 1, further including:

a plurality of slots positioned in opposing sides of the drawer, each slot extending from proximate to the bottom to proximate to the top of the drawer; and a plurality of pins, each pin being engaged to the tray and extending through a respective slot, such that the pins guide the tray between the stowed configuration and the deployed configuration.

9. An article exchange system comprising:

a structure comprising a wall;

a service window positioned in the wall;

an opening positioned in the wall below the service window;

a housing mounted in the service window, such that the housing extends from the opening into the structure, the housing having a front face, the front face being open;

a set of drawer slides engaged to and positioned in the housing, such that the drawer slides are selectively extensible through the front face of the housing;

a drawer operationally engaged to the set of drawer slides, such that the drawer is selectively extensible through the opening;

a tray positioned in the drawer;

a plurality of fasteners engaged to the tray, each fastener being configured for selectively engaging a respective article, such that the respective article is removably engaged to the tray; and a lift module operationally engaged to the tray such the tray is elevated relative to the drawer, the lift module being positioned for selectively elevating the tray from a stowed configuration, wherein the tray is positioned proximate to a bottom of the drawer, to a deployed configuration, wherein the tray is positioned proximate to a top of the drawer and wherein the respective article is accessible to a person seated in a vehicle positioned exterior to the structure and proximate to the service window.

10. An article exchange assembly comprising:

a housing configured to be mountable in an opening in a wall of a structure below a service window positioned in the wall, such that the housing extends from the opening into the structure, the housing having a front face, the front face being open, the front face being positioned substantially flush to an exterior surface of the wall, the housing having a rear face, the rear face being open;

a set of drawer slides engaged to and positioned in the housing, such that the drawer slides are selectively extensible through the front face of the housing;

a drawer operationally engaged to the set or drawer slides, wherein the drawer is configured for selectively extending through the opening, a front of the drawer being circumferentially larger than the opening, such that the opening is substantially closed with the drawer is positioned in the housing, the set of drawer slides comprising two drawer slides positioned singly on opposing sides of the drawer, each drawer slide comprising:

a track engaged to the drawer, and a plurality of rollers engaged to the housing, each roller being operationally engaged to a respective track, such that the respective track is rollably extensible along associated rollers through the front face of the housing and the opening;

a tray positioned in the drawer, the tray comprising:

a bottom panel, a pair of opposed side panels extending from opposed edges of the bottom panel, and a rear panel extending from a rear edge of the bottom panel and between the opposed side panels;

a plurality of fasteners engaged to the tray, each fastener being configured for selectively engaging a respective article, such that the respective article is removably engaged to the tray, the plurality of fasteners comprising:

a set of holes positioned in the bottom panel, each hole being sized complementarily to a beverage container, wherein the hole is configured for insertion of the beverage container for removably engaging the beverage container to the tray, the hole comprising a recess in the tray, and a connector engaged to the bottom panel and being configured for engaging a point of sale device, wherein the connector is configured for engaging the point of sale device to the tray;

a lift module operationally engaged to the tray such the tray is elevated relative to the drawer, the lift module being positioned for selectively elevating the tray from a stowed configuration, wherein the tray is positioned proximate to a bottom of the drawer, to a deployed configuration, wherein the tray is positioned proximate to a top of the drawer and wherein the respective article is accessible to a person seated in vehicle positioned exterior to the structure and proximate to the service window, the lift module comprising a handle engaged to the rear panel and extending through an aperture positioned in a rear of the drawer, the aperture extending from proximate to the bottom to proximate to the top of the drawer, wherein the handle is configured for grasping in a hand of a user positioned in the structure proximate to the service window, positioning the user for pushing the drawer along the drawer slides through the opening and for lifting the tray, such that the respective article is accessible to the person seated in the vehicle;

a plurality of slots positioned in the opposing sides of the drawer, each slot extending from proximate to the bottom to proximate to the top of the drawer; and a plurality of pins, each pin being engaged to the tray and extending through a respective slot, such that the pins guide the tray between the stowed configuration and the deployed configuration.

* * * * *